United States Patent
Horn et al.

[11] 3,918,075
[45] Nov. 4, 1975

[54] CAMERA AND FILM MAGAZINE THEREFOR

[75] Inventors: Donald N. Horn, Huntington; Rein S. Randmae, Fort Salonga, both of N.Y.

[73] Assignee: First Foto, Inc., St. Louis, Mo.

[22] Filed: Apr. 8, 1974

[21] Appl. No.: 459,332

[52] U.S. Cl. .............................. 354/213; 354/275
[51] Int. Cl.² ............................................ G03B 1/00
[58] Field of Search ............ 354/80, 105, 212, 213, 354/275

[56] References Cited
UNITED STATES PATENTS
3,460,891    8/1969    Bley .............................. 354/213 X

*Primary Examiner*—Monroe H. Hayes
*Attorney, Agent, or Firm*—Burns, Doane, Swecker & Mathis

[57] ABSTRACT

A camera assembly suitable for operation by an operator having minimal photographic skills. The camera assembly includes a compartment for receiving a removable film magazine. A mechanism is provided for selectively exposing the film and includes an actuator which is manually shiftable between a cocked position and a triggering position. The actuator is shifted to a cocked position in response to advancement of the film. A metering mechanism is drivingly connected so as to be driven in response to film advancement. The metering mechanism includes a stop arm automatically shiftable to a safety position in response to predetermined advancement of the film to prevent further film advancement. A manually operable synchronizing cam is provided for affording manual release of the stop arm from its safety position to permit further advancement of the film in the event that the stop arm enters its safety position prematurely.

The film magazine includes detachable base and cover elements. The base element has first and second pockets. The first pocket carries a film supply cassette of light-tight construction. The second pocket carries an uncased wind-up spool and is constructed so as to provide a light-tight seal around such wind-up spool. A plurality of ribs press the film against an exposure opening. Spring clips are provided for detachably connecting these.

8 Claims, 16 Drawing Figures

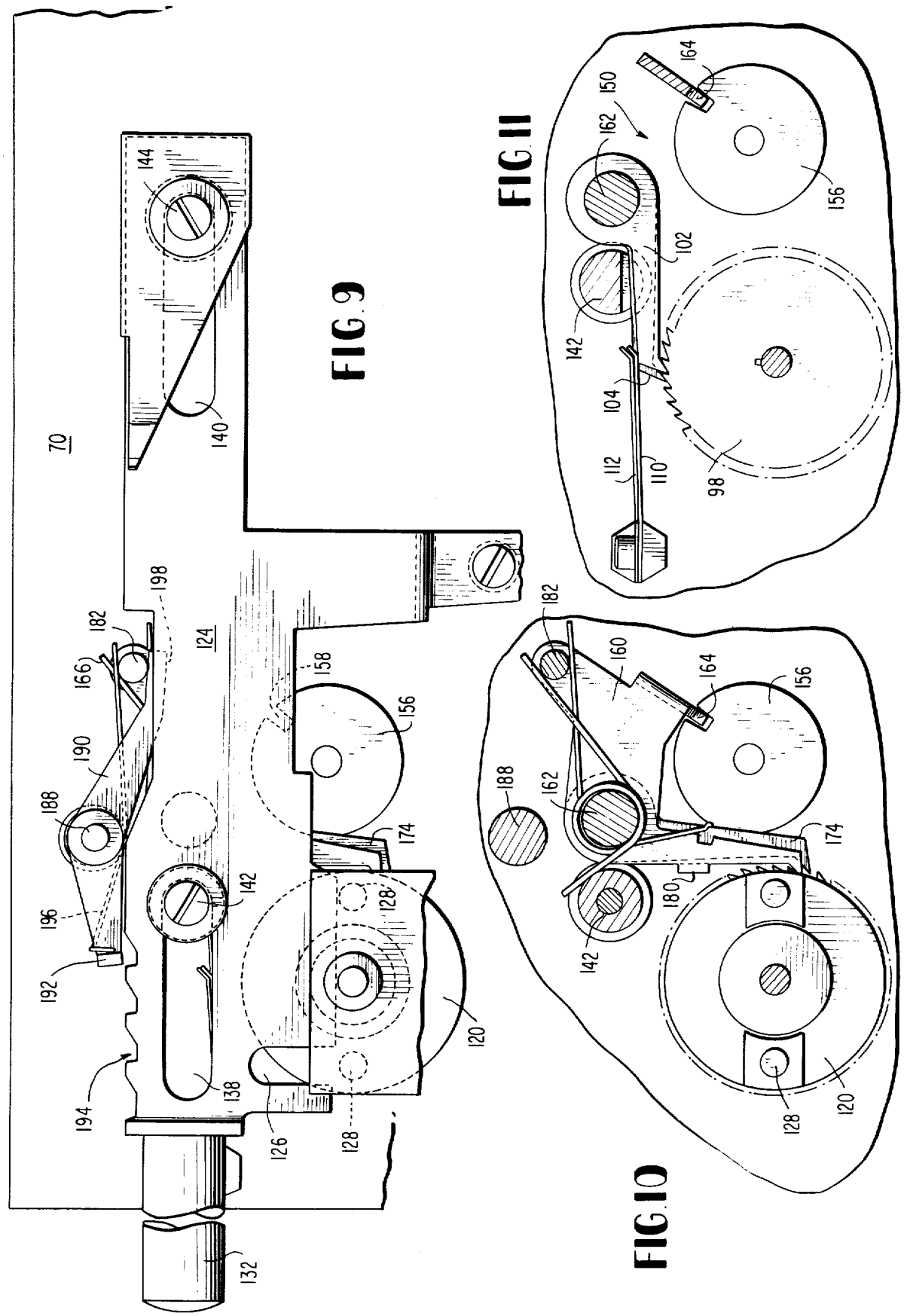

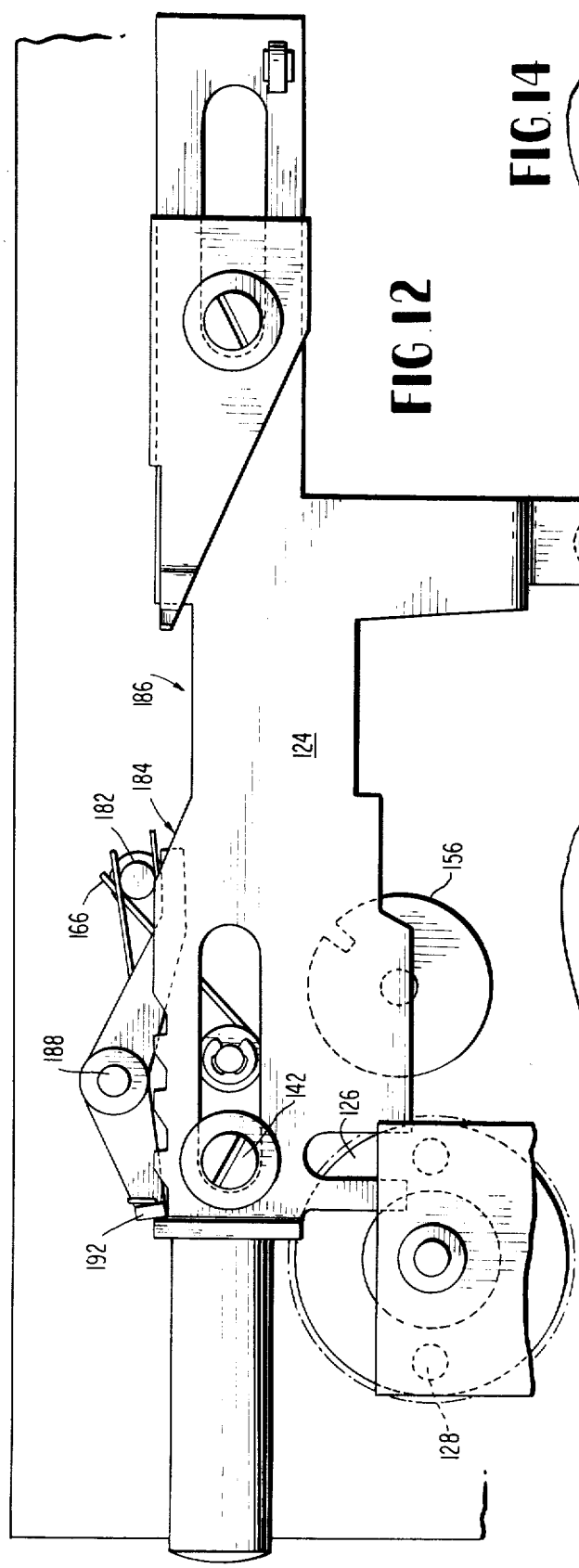
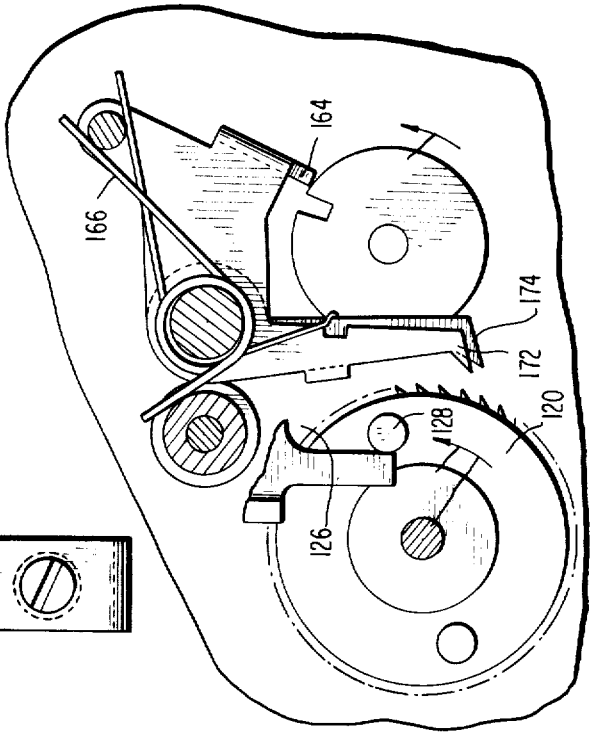
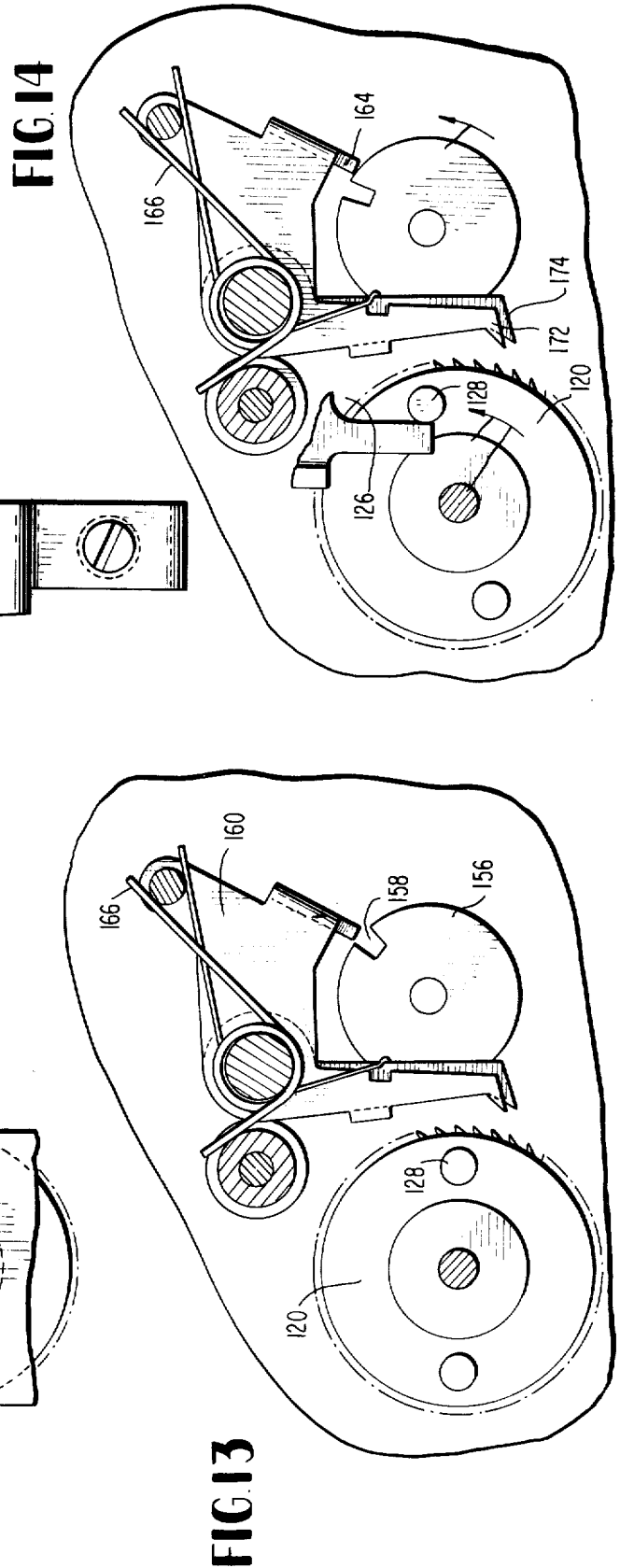
FIG. 12
FIG. 14
FIG. 13

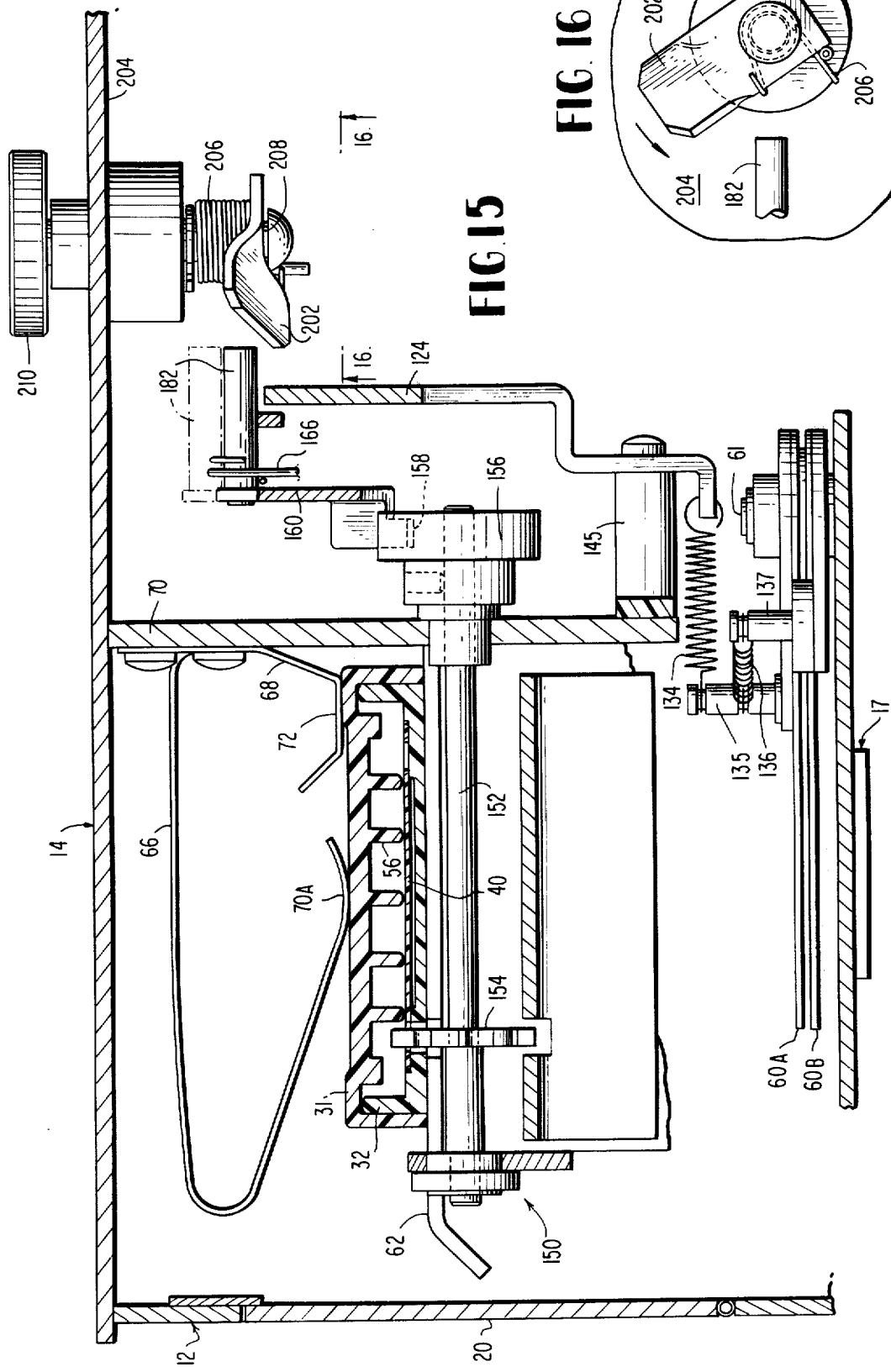

CAMERA AND FILM MAGAZINE THEREFOR

BACKGROUND AND OBJECTS OF THE INVENTION

The present invention relates to photographic equipment and techniques, especially as concerns the photographing of newborn infants in hospitals.

The photographing of newborn infants is today a standard practice in many hospitals as one prescribed means of child identification. It is preferable, in the interest of economy and convenience, that photographic equipment be located in the hospital and that it be operated by the hospital staff, such as nurses, independently of professional photographers. Once the pictures are taken, the film may be delivered to suitable developers for appropriate processing. It will be apparent that hospital nurses designated as camera operatives might possess only minimal photographic knowledge and skills. Since the photographing of newborn infants may be of significant importance for later identification, it is desirable that the camera equipment and techniques be capable of effective, yet convenient and simplistic operation so as to be essentially fool-proof during operation by photographically unskilled personnel.

Thus, it would be highly desirable to provide photographic equipment and techniques characterized by convenient loading, unloading and actuation requiring minimum knowledge and skill of the operator. Equipment and techniques of this sort are described in U.S. Brey et al. patent No. 3,460,891 assigned to the present assignee. While equipment and techniques described therein have proven effective, room for improvement remains.

It is one object of the present invention to minimize or obviate problems of the types previously discussed.

It is another object of the present invention to provide effective photographic equipment and techniques requiring minimal manipulation by the operator.

It is an additional object of the present invention to provide such photographic equipment and techniques for hospital use in photographing newborn infants by hospital personnel.

It is a further object of the invention to provide a film magazine which is economical, effective, and simple to manipulate.

BRIEF DESCRIPTION OF A PREFERRED EMBODIMENT OF THE INVENTION

At least some of the above objects are accomplished by the provision of a camera assembly which is suitable for operation by an operator having minimal photographic skills. The camera assembly includes a housing disposable above a target zone, and being arranged to receive a movable film magazine. The magazine is preferably of the type carrying a film supply spool and a film wind-up spool. The camera assembly comprises a lens mounted to the housing and aimed downwardly therefrom. A magazine receiving compartment is provided and includes an aperture disposed above the lens and a door which is selectively openable to expose the interior of the compartment so as to permit generally horizontal insertion of the film magazine. The door includes a manually operable first drive mechanism which is rotatably connectible with the wind-up spool of an installed magazine. A spring assembly is provided for retaining the magazine in proper alignment relative to the aperture. A mechanism is provided for selectively uncovering the lens and includes an actuator which is manually shiftable between a cocked position and a triggering position. A second drive mechanism is drivingly connectible to the wind-up spool for shifting the actuator to a cocked position in response to rotation of the first drive mechanism. A metering mechanism is drivingly connected so as to be driven in response to advancement of the film in the magazine. This metering mechanism includes a stop element which is automatically shiftable to a safety position in response to predetermined advancement of the film so as to prevent further film advancement. A manually operable synchronizing mechanism is provided for releasing the stop element from its safety position to permit further advancement of the film in the event that the stop element moves to its safety position prematurely.

The film magazine preferably comprises a base element and a releasable cover element. The base element includes a pair of spaced pockets. A first of these pockets carries a supply of film housed in a substantially light-tight cassette. The second pocket carries a wind-up spool. The second pocket has pairs of spaced wall portions defining recesses at the ends of the second pocket for receiving end flanges of the wind-up spool. Spaced side wall portions are provided along an outer side of the second pocket to define a side recess. A strip of resilient material is disposed along an inner side of the second pocket to underlie film extending between the cassette and the wind-up spool. Between the pockets is disposed an intermediate film guiding section which includes a light access opening surrounded by a downwardly projecting flange. A secondary opening is spaced from the light access opening and is operable to receive a portion of a rotatable sprocket wheel of a camera. Photographic film extends between the cassette and the wind-up spool. The film includes a row of spaced apertures arranged in overlying relationship to the secondary opening.

The cover element is positionable atop the base element and includes end sections arranged to overlie the pockets and an intermediate section arranged to overlie the film guiding portion of the base element. The end section which overlies the second pocket includes a lip extending across an outer side of such end section, the lip being received in the side recess of the second pocket.

The intermediate section of the cover element includes a series of ribs extending downwardly to engage the film, and a transverse wall disposed above the strip of resilient material to press the film there against. A connecting mechanism is provided for releasably attaching the cover element to the base element. Handles are provided for manipulating the magazine into and from a camera.

THE DRAWINGS

FIG. 9 is a sectional view of a lens uncovering mechanism taken along the line 9—9 of FIG. 4, illustrating this mechanism in a cocked position;

FIG. 10 is a view similar to FIG. 5 illustrating the metering mechanism in a different position of operation;

FIG. 11 is a sectional view taken along the section line 11—11 of FIG. 4, illustrating portions of the lens uncovering mechanism and the metering mechanism;

FIG. 12 is a view similar to FIG. 9 illustrating the actuator in a triggering position;

FIG. 13 is a view similar to FIG. 5 illustrating the metering mechanism in a different position of operation;

FIG. 14 is a view similar to FIG. 5 illustrating the metering mechanism in still another position of operation;

FIG. 15 is a sectional view of the camera mechanism taken along the section line 15—15 of FIG. 4; and FIG. 16 is a view of a synchronizing mechanism taken from below along the line 16—16 of FIG. 15.

DETAILED DESCRIPTION OF A PREFERRED EMBODIMENT

Figure 1:
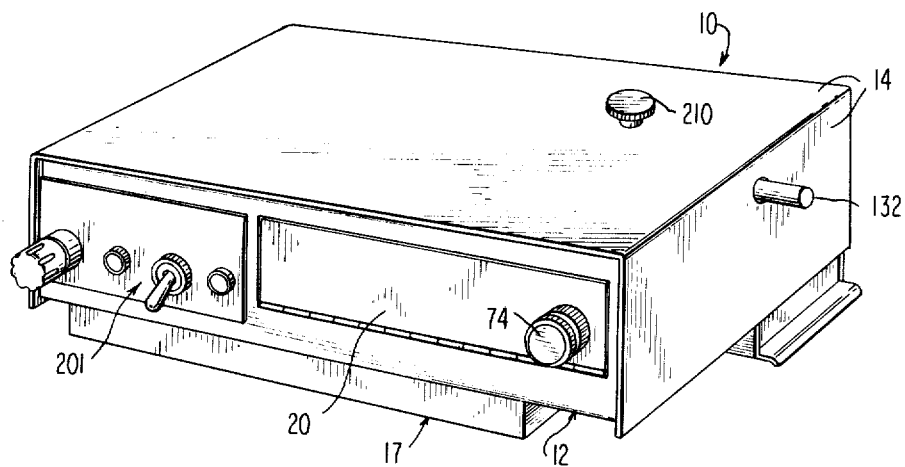
FIG. 1 is a perspective view of a camera mechanism in accordance with the present invention.
Figure 2:
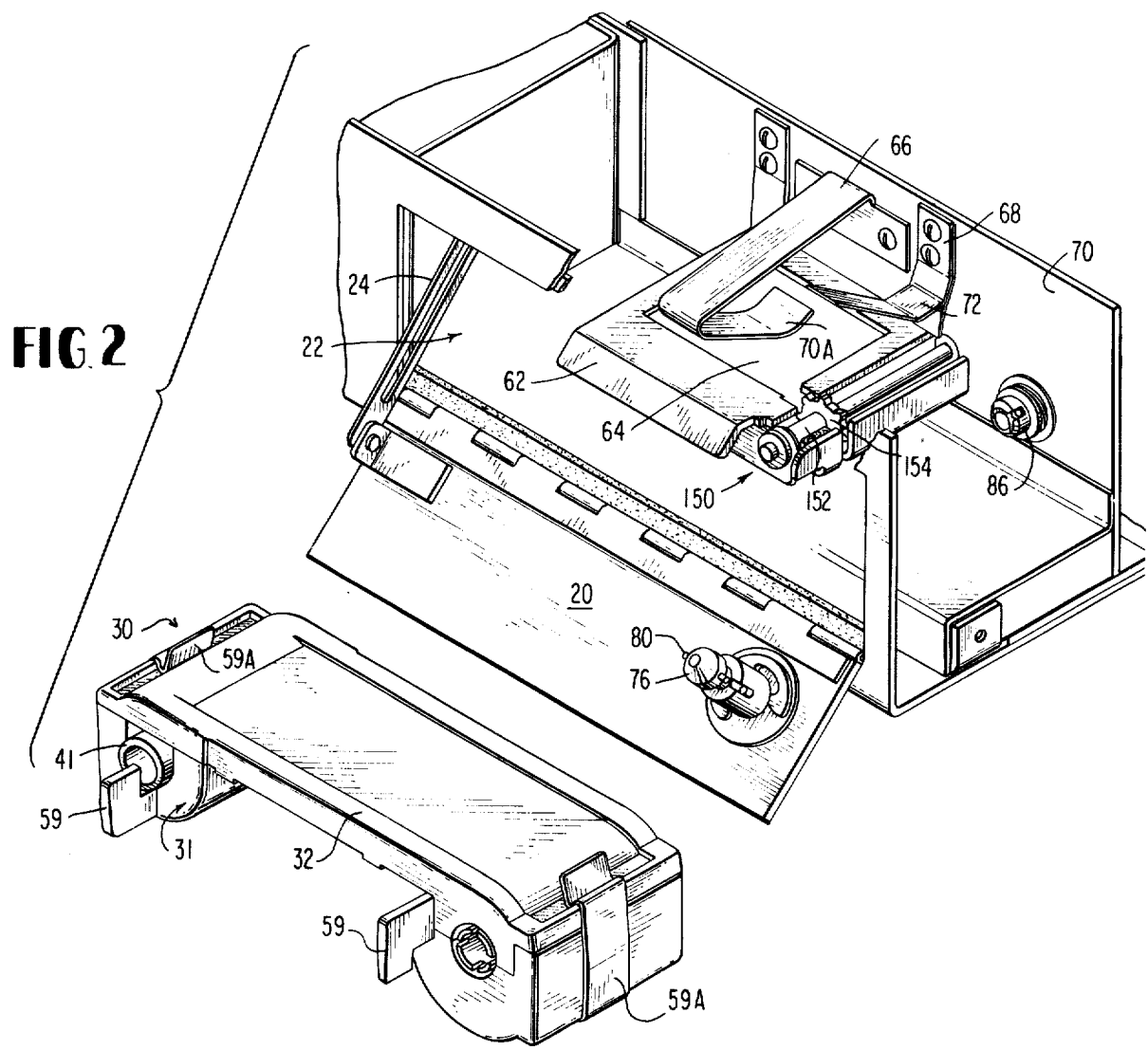
FIG. 2 is an exploded view, in perspective and with parts broken away, of the camera mechanism in conjunction with a film magazine in accordance with the invention.

The preferred photographic equipment of the present invention includes a camera comprising a housing 10 that includes a base portion 12 and a cover portion 14 (FIGS. 1 and 2). The camera may include a mounting flange (not shown) for mounting the camera on a support member at a location above a target zone that is suitable for receiving a subject to be photographed. Such a target may comprise a table for supporting a newborn infant as shown in the aforementioned U.S. Brey et al. patent No. 3,460,891. A lens 17 is mounted at the bottom of the housing base 10 to be aimed toward the target zone.

At the front of the housing there is located a hinged door 20 which may be swung open to expose an interior compartment 22. The door includes an arm 24 which is gripped by a latch mechanism 26 to hold the door in a closed position. The compartment 22 is designed to receive a film magazine 30 of the type carrying film supply and wind-up spools.

Figure 3:
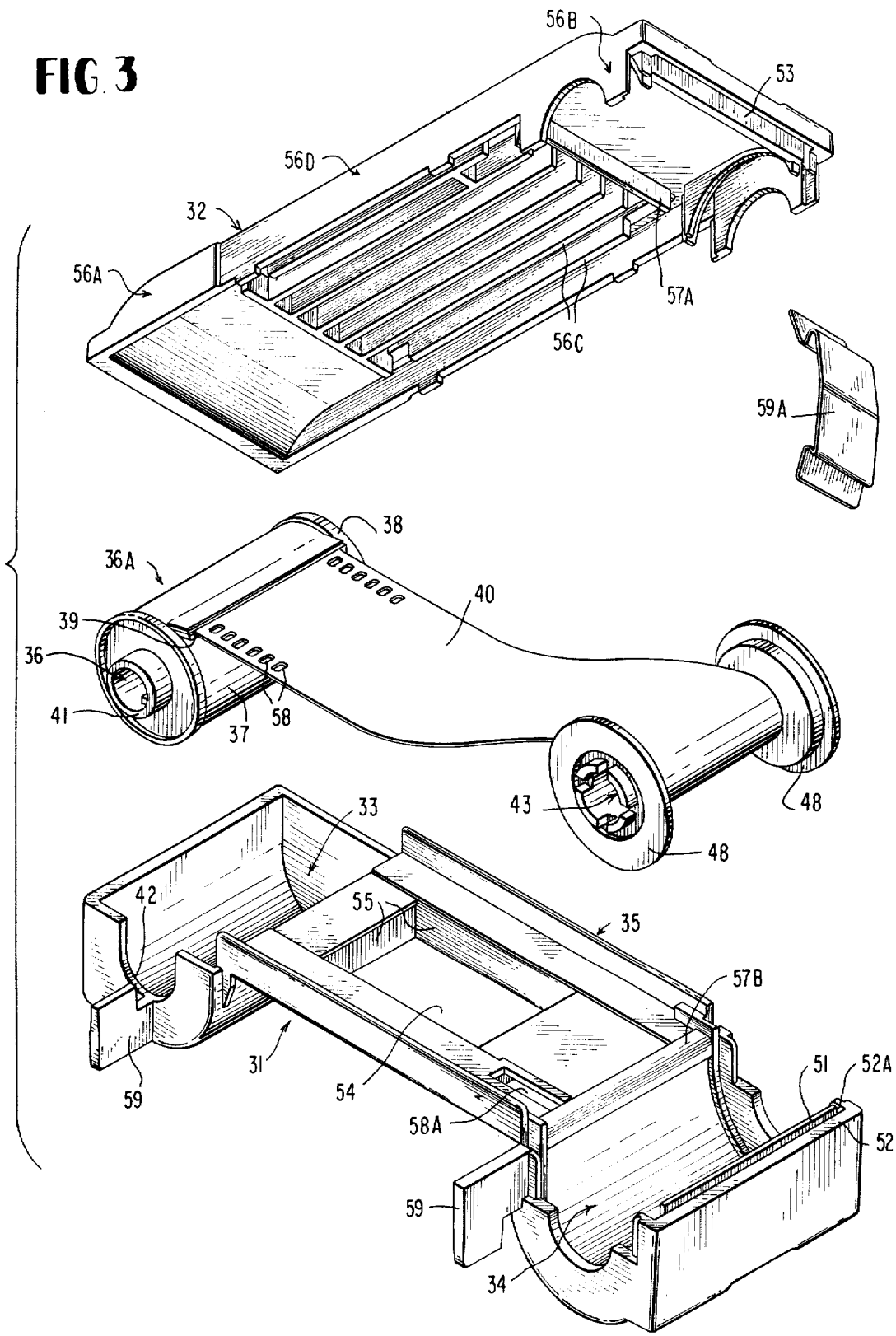
FIG. 3 is an exploded view of the film magazine.

The film magazine 30 may be formed of plastic and includes detachable base and cover element 31, 32 as shown in FIG. 3. The base section 31 has a pair of pockets 33, 34 at the ends thereof and an intermediate film guiding section 35. One of the pockets 33 rotatably receives a film supply spool 36 mounted in a light-tight cassette 36A. The cassette 36A includes a spool-receiving cup portion 37 and a cap portion 38. A fabric-lined light-tight slit 39 therein accommodates passage of the film 40. An axle stub 41 of the supply spool projects from a wall of the cassette and fits rotatably within a rounded slot 42 of the base element.

The other pocket 34 is adapted to rotatably support the front and rear bearing axles 43, 44 of a wind-up spool 45. The pocket 34 includes, at each end, a pair of spaced wall sections 46, 47 which define a groove 47A for the reception of an annular end flange portion 48 of the spool 45.

The cover element 32 also includes spaced wall sections 49, 50 which define grooves 50A for receiving the end flanges 48.

Spaced wall sections 51, 52 along the side of the pocket 34 define a recess 52A for the reception of a lip 53 extending from one side of the cover element 31.

Figure 8:
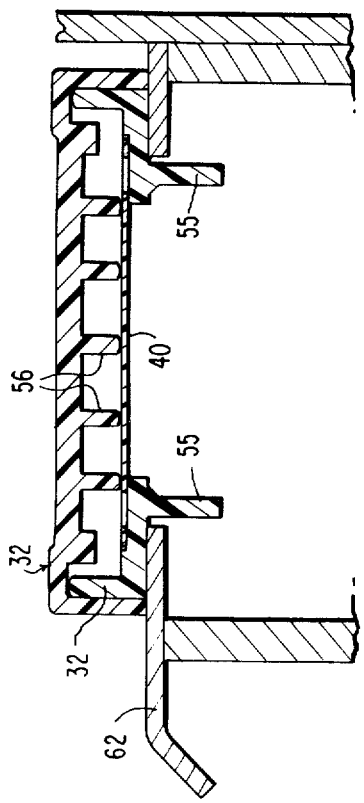
FIG. 8 is a transverse sectional view of an installed film magazine taken along the section line 8—8 of FIG. 4.

The intermediate film guiding section 35 includes an opening 54 surrounded by a rectangular flange assembly 55 which projects downwardly from the base element 31 (see FIG. 8). The cover 32 has end sections 56A, B which overlie the pockets 33 and 34. A series of longitudinal ribs 56C are provided in an intermediate section 56D. These ribs, when the base and cover elements are assembled together, press against the film to maintain the film in a flattened condition above the opening 54. A transverse wall 57A presses the film against a felt pad 57B to assure a light-tight seal around the pocket 34. The film 40 includes openings 58 which are accessible through an opening 58A in the intermediate film guiding portion of the base element 31. A pair of handle members 59 are provided on the base element to facilitate insertion of the magazine into the compartment 22. A pair of spring clips 59A are provided for removably securing the base and cover elements 31 and 32 together.

Film from the supply cassette may be suitably attached to the wind-up spool 45. When the cover element 32 is installed onto the base element 31, the end flanges are received within the grooves 47A, 50A; the lip 53 is received in the recess 52A; and the wall 57A presses the film against the felt pad 57B to establish a substantially light-tight seal around the pocket 34.

At the bottom of the camera base 12 there is disposed a shutter mechanism 60 (FIG. 15) comprising a pair of plates 60A, 60B which are pivoted to a pin 61. The shutter plates, as will be described, are located above the lens 17 and may be selectively opened to admit light into the compartment 22.

Within the compartment 22 is mounted a floor plate 62. This floor plate 62 includes an aperture 64 which is disposed above the shutter mechanism and is dimensioned to receive the rectangular flange 55 of the magazine 30. The aperture 64 conducts light from the lens to the film when the shutter mechanism is opened.

When the door 20 is swung open, the magazine 30 may be inserted horizontally into the compartment until the magazine flange 55 seats within the aperture 64. A pair of metal spring strips 66, 68 are fixedly attached to a wall 70 of the compartment 22 and are positioned to engage and retain the magazine 30 in its aligned position on the floor plate 62. During insertion of the magazine the spring strips 66, 68 are cammed upwardly by the magazine until the flange 55 is located over the aperture 64. At that point the magazine 30 is biased downwardly by portions 70A, 72 of the spring strips such that the flange 55 seats within and is retained within the aperture 64.

Figure 7:
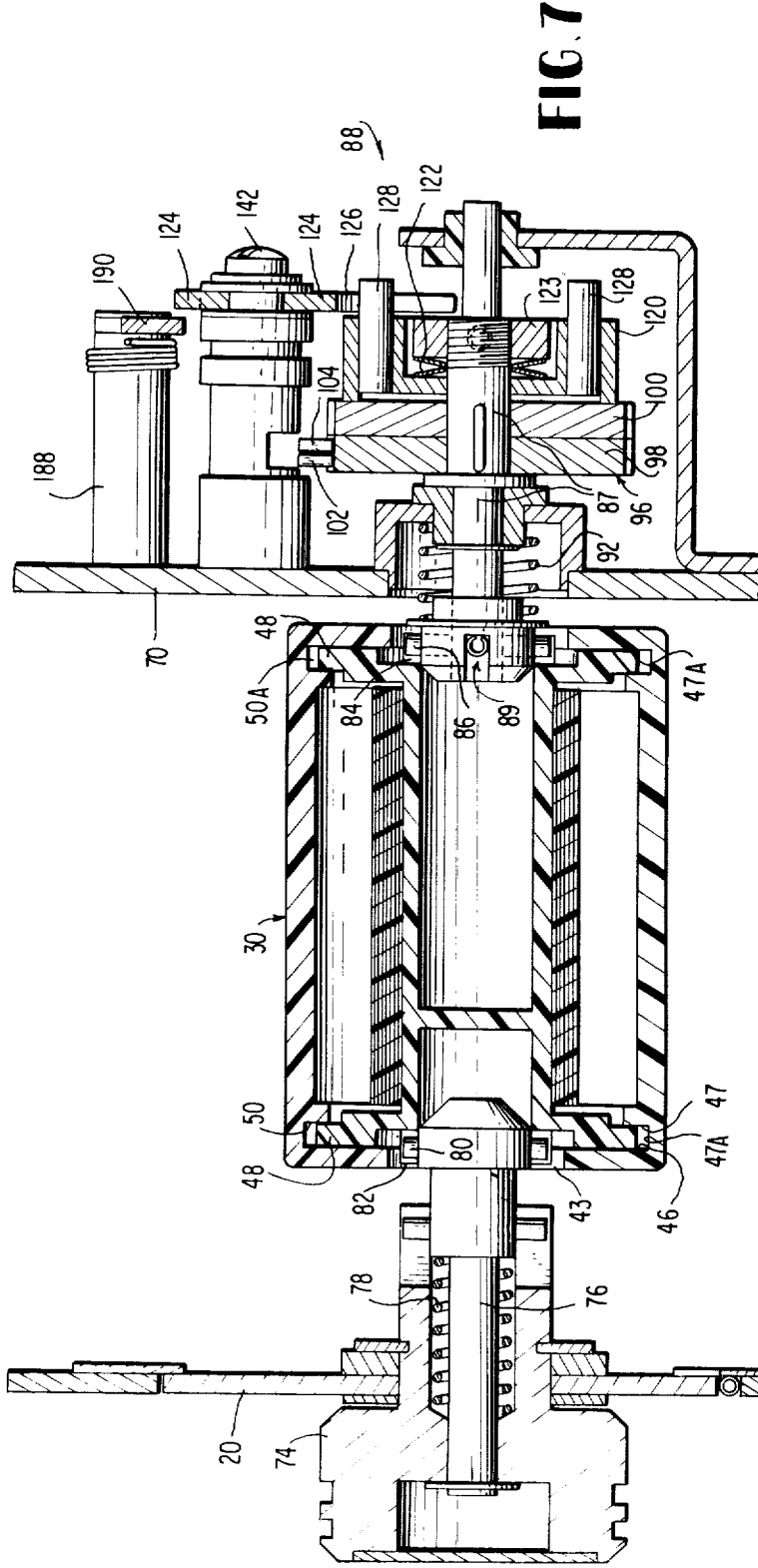
FIG. 7 is a sectional view of the metering mechanism taken along the section line 7—7 of FIG. 4.

The door 20 includes a film advance knob 74 which is telescopingly connected to a shaft 76 (FIG. 7). The shaft 76 slides within the knob 74 and is spring-biased outwardly by a compression spring 78. This shaft 76 carries a pair of transverse pins 80 that are receivable within front recesses 82 formed in the front axle 43 of the wind-up spool 45. The yieldable mounting of the shaft 76 enables the shaft to retract when the door is closed with the pins 80 being non-aligned with the front recesses 82 in the wind-up spool. Subsequent turning of the knob 74 will cause the pins 80 to become aligned with and enter the recesses 82 to drivingly couple the film advance knob to the wind-up spool.

Located in longitudinal alignment with the shaft is a spring-biased cap 86 which is mounted on a rod 87 via pin and slot connections 89 so as to be slidable and non-rotatable relative thereto. The rod 87 serves as the drive shaft for a shutter-actuating assembly 88 as will be later explained.

The cap 86 carries a pair of transverse pins 90 and is spring biased toward the compartment 22 by a compression spring 92. In the event that a pair of rear recesses 94 of the wind-up spool 45 are non-aligned with the pins 90 when the magazine 30 is installed in the compartment 22, the cap 86 will slide on the rod 87 against the bias of the spring 92. When the wind-up spool is rotated to effect alignment between the pins 90 and the recesses 94, the pins will enter the recesses to drivingly couple the wind-up spool 45 with the rod 87.

The rod 87 is rotatably coupled to a wheel assembly 96. The wheel assembly 96 includes a pair of integrally rotatable sprocket wheels 98 and 100. A pair of pawls 102, 104 (FIGS. 7 and 11) are pivotally mounted on pin 162 and are biased toward the sprocket wheel 98 by leaf springs 110, 112. The outer edges of the pawls 102, 104 are engageable with the teeth of the sprocket wheel 98 to permit only one-way rotation of the rod 87 and the wheel assembly 96 (i.e. counter clockwise rotation as viewed in FIGS. 9–11).

A clutch wheel 120 is mounted on the rod 87 and is spring biased toward the sprocket wheel 100 by a washer spring 122, the latter being held by a threaded nut 123. Thus, the sprocket wheel 100 is capable of frictionally driving the clutch wheel 120.

Figure 4:
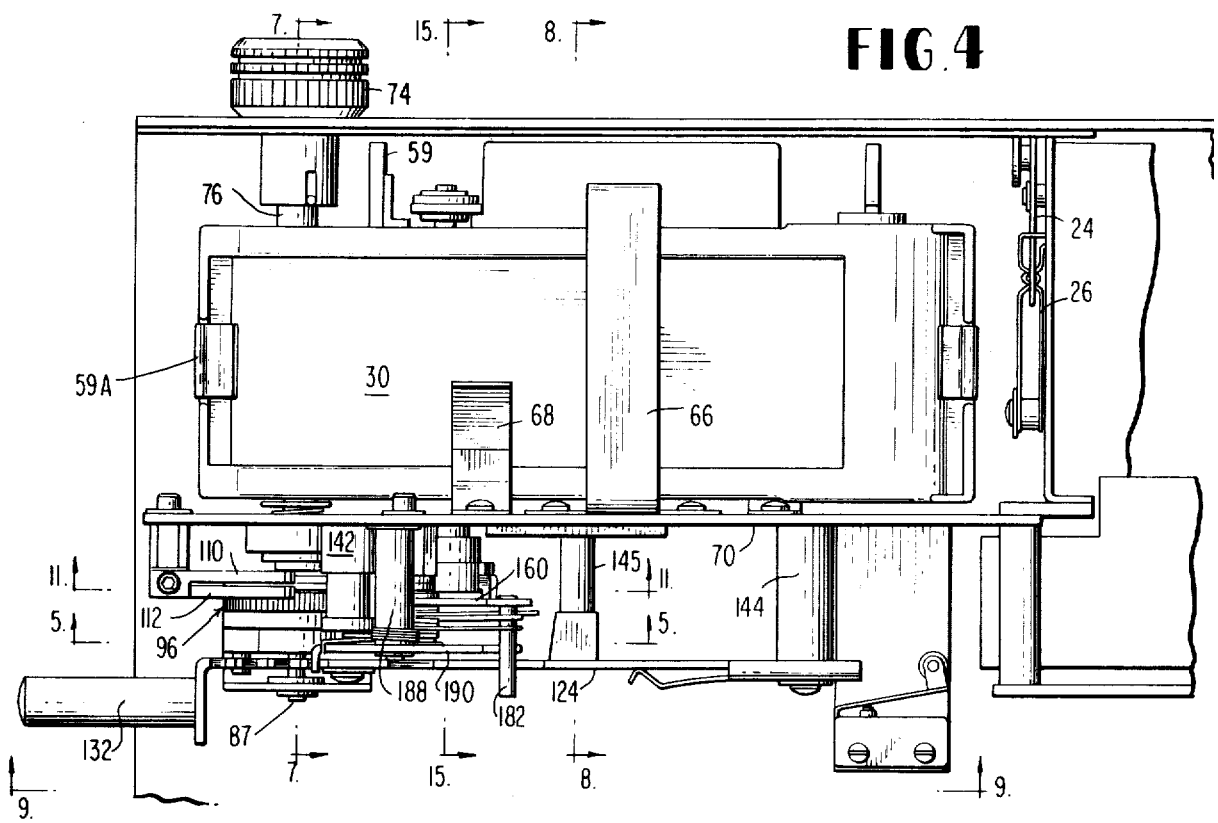
FIG. 4 is a plan view of part of the camera mechanism with a cover portion thereof removed.

A shutter actuator in the form of a slide 124 is disposed for longitudinal sliding movement adjacent the clutch wheel 120 (FIGS. 4, 7 and 9). The actuator slide 124 includes a downwardly open channel 126 which is capable of receiving alternate ones of a pair of drive lugs 128 projecting from the clutch wheel 122. As will be explained subsequently, when the actuator 124 is located in a triggered position (FIG. 12), rotation of the clutch wheel 120 causes one of the lugs 128 to enter the channel 126 and longitudinally shift the actuator toward a cocking position (FIG. 9). When this position is reached, the lugs will be free of the channel 126, enabling the actuator 124 to be shifted toward a triggered position. A removable button 132 extends through an aperture 133 in the housing cover 14 and is screwed onto a threaded portion of the actuator 124 to facilitate manual shifting thereof.

An appropriate shutter-opening linkage is operably connected to the shutter mechanism 60 (FIG. 15). For example, a spring 134 may be connected between the actuator 124 and a post 135 mounted on the shutter plate 60A. Movement of the actuator 124 between its cocked and triggered positions causes the spring 134 to assume alternate off-center positions to rotate the shutter plate 60A in opposite directions, i.e. between open and closed positions. A spring 136 is connected between the post 135 and a post 137 on the shutter plate 60B to assure that the shutter plate 60B follows the shutter plate 60A.

The actuator 124 has a pair of guide grooves 138, 140 which slidably receive a pair of pins 142, 144 that are fixed to the wall 70 (FIGS. 4 and 9). This pin and groove connection guides the actuator 124 for longitudinal movement. A nylon element 145 (FIG. 15) is carried by the actuator 124 and slides against the wall 70 to further guide the actuator.

As will be apparent, when the knob 74 is rotated, the wind-up spool 45 functions to advance film within the magazine and also, in instances to be explained, to move the actuator 124 toward its cocked position.

Figure 5:
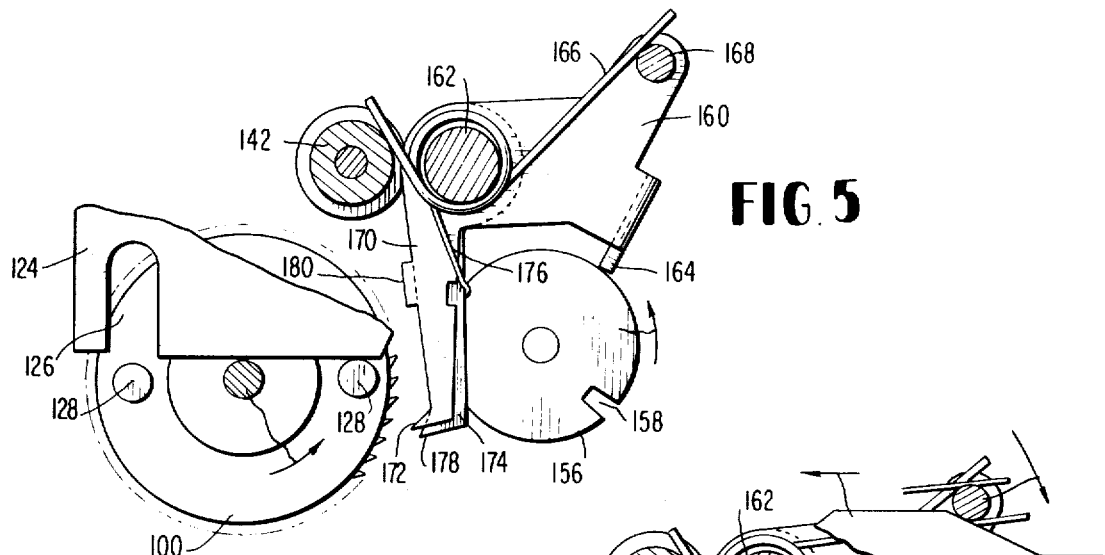
FIG. 5 is a sectional view of a metering assembly portion of the camera mechanism taken along the section line 5—5 of FIG. 4.

In order to automatically meter a proper amount of film to be advanced for succeeding photographs, a metering mechanism 150 is provided (FIGS. 5 and 15). The metering mechanism 150 comprises a rotary shaft 152 rotatably disposed in the compartment 22 adjacent the aperture 64 (FIG. 2). A sprocket wheel 154 is fixed to the rotary shaft 152 and is disposed so as to be received within the drive holes 59 provided in the film 40. The shaft 152 projects through the wall 70 and carries a metering wheel 156 for rotation therewith. Reception of the sprocket teeth of the sprocket wheel 154 within the holes 58 of the film enables the film, when advanced, to rotate the shaft 152 and the metering wheel 156.

The metering wheel 156 includes a slot 158 on the periphery thereof (FIG. 5). The periphery of the wheel 156 is dimensioned such that one rotation thereof is the equivalent of a proper advancement of the film.

A stop arm 160 is pivotally mounted to a pin 162 fixed to the wall 70. The stop arm includes a stop projection 164 which is sized to be received within the slot 158 of the metering wheel 156. A spring 166 engages a bar 182 of the stop arm to bias the stop arm and its projection 164 toward the periphery of the metering wheel 156, thereby tending to urge the projection 164 into the slot when the two are aligned. This can occur when the film has been advanced by a proper amount.

A leg 170 of the stop arm 160 has a foot 172 pointed toward the sprocket wheel 100. The arrangement is such that with the stop projection 164 located in the slot 158, the foot 172 will engage a tooth of the sprocket wheel 100 to prevent rotation of the wheel assembly 96, thereby preventing further film advancement (FIG. 10). In order to increase the effectiveness of the foot 172, an auxiliary stop leg 174 is rotatably mounted on the pin 162 and is biased toward the sprocket wheel 100 by a spring 176. A foot 178 of this auxiliary leg 174 is spaced slightly relative to the foot 172 such that, in the event that the stop arm is swung to a wheel-stopping position (FIG. 9), it is assured that one of the foot members 172, 178 will immediately engage a sprocket tooth to prevent further movement of the wheel assembly 96. Movement of the leg 170 away from the sprocket wheel (in a manner to be subsequently described) is transmitted to the auxiliary leg 174 by a lip 180 which is attached to the leg 170 and extends into the path of the auxiliary leg 174.

The stop arm includes a release bar 182 which rides atop the actuator 124. When the actuator 124 is in its triggering position, a cam section 184 of the slide is disposed beneath the release bar 182 and holds the projection 164 out of engagement with the slot 158 (FIG. 12). During initial movement of the actuator slide from its triggering position toward its cocked position, the release bar can pass into a recessed portion 186 of the actuator slide 124 in a manner allowing the spring 166 to urge the projection 164 into the slot 154 if proper alignment exists therebetween.

Pivotally mounted on a pin 188 fixed to the wall 70 is a finger 190 (FIG. 9). One end 192 of the finger 190 lies above the actuator 124, the latter carrying a toothed rack 194. A spring 196 biases the end 194 of the finger 190 toward the rack 194. The other end 198 of the finger 190 extends beneath the release bar 182. The spring 166 biasing the stop arm 160 and its release bar 182 is stronger than the spring 196 biasing the finger 190. Thus, when the release bar 182 travels downwardly into the recessed area 196, the finger 190 is rotated in a manner raising the end 192 thereof from engagement with the rack 194. It will be understood that when the end 192 of the finger 190 engages the teeth of the rack 194 (FIG. 12), movement of the actuator 124 toward its triggering position is prevented.

The camera assembly could, if desired, be utilized with a solenoid-type mechanism (not shown) which would lock the actuator 124 against movement toward the triggering position until an identification card is inserted within the camera. Suitable reflective apparatus would reflect an identification number from the card to the film as the picture is being taken.

A control panel 121 is provided on the front of the housing to control various electrical systems of the camera (not shown) which do not constitute the present invention.

In operation, a film magazine is installed within the compartment 22 so that the flange 55 is disposed within the aperture 64. The door 20 is closed and the knob 74 is rotated so that proper drive coupling is effected with the wind-up spool 45 and the rod 87.

Continued turning of the knob 74 shifts the actuator 124 toward its cocked position by means of the driving engagement of a lug 128 within the channel 126. At the same time, the film 40 is advanced and rotates the sprocket wheel 154 and the metering wheel 156. When a proper length of film has been advanced, the slot 158 becomes aligned with the stop projection 164 and the spring 166 biases the projection into the slot. This causes the foot members 172, 178 to be rotated into engagement with the sprocket wheel 100 so as to prevent further rotation of the film advance knob 74. The condition of the actuator 124 is shown in FIG. 9 and that of the metering mechanism is indicated in FIG. 10.

When a newborn infant has been placed in the target zone by a nurse, the nurse merely pushes the button 132 to shift the actuator 124 to its triggering position wherein the shutter mechanism is activated to expose the film (FIG. 12). By so doing, the cam portion 184 of the actuator 124 has raised the release bar 182 to remove the stop projection 164 from the slot 158 (FIG. 13).

The knob 74 may again be freely rotated. Initial degrees of turning serve to advance the film and thus turn the metering wheel 156 and thus disalign the slot 158 and the stop projection 164. Therefore, by the time that the lug 128 enters the channel 126 and begins to shift the actuator 124, it is no longer possible for the projection to enter the slot 158 when the recessed portion 186 of the actuator 124 passes beneath the release bar 182. Actually, the release bar will remain in a raised posture relative to the recessed portion 186 until the projection 164 re-enters the slot 158.

Figure 6:
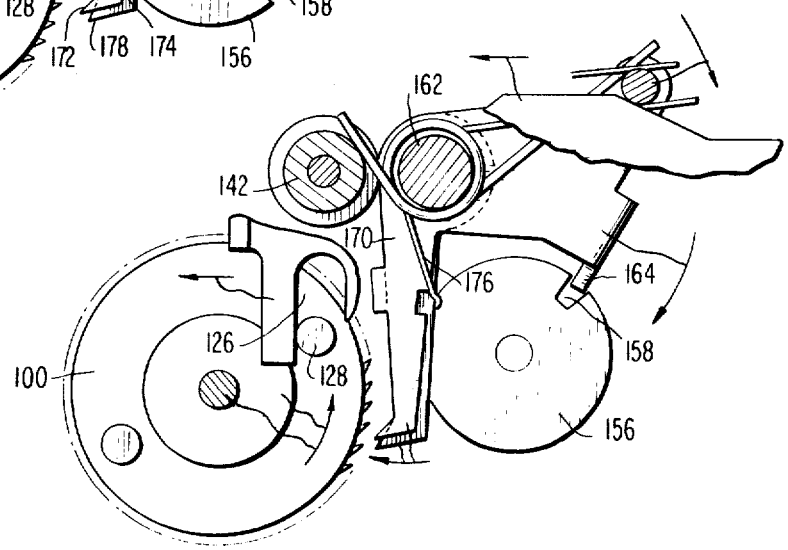
FIG. 6 is a view similar to FIG. 5 showing the metering mechanism in a different position of operation.

Since the present photographic equipment is likely to be utilized by nurses who are relatively unskilled in the use of cameras, it is possible that careless operation may result in the shutter actuator mechanism 88 and the film metering mechanism 150 becoming unsynchronized. For example, it may occur that a magazine 30 is removed from the compartment 22 before the film therein is completely expended and is then replaced before being delivered for processing. It will be apparent that when this magazine is removed, engagement between the wind-up spool 45 and the rod 87 is broken, thereby allowing the tightly wound film on the wind-up spool 45 to become slightly unwound or unravelled. If this same magazine is then re-inserted, with the film in such an unravelled state, subsequent rotation of the knob 74 will cause the slack in the unwound film to be taken up before the film is further advanced. Thus, the actuator 124 will be traveling toward its cocked position before the slot 158 has been rotated from alignment with the stop projection 164. Consequently, there occurs the risk that the release bar 120 will enter the recessed portion 186 before the slot 158 is rotated. In such an event, the projection 164 will re-enter the slot 158, and the foot members 172, 178 will engage the sprocket wheel 100, thereby preventing any advancement of the film. This condition is shown in FIG. 6 wherein the projection 164 and the foot members 172, 178 are about to assume a wheel-stopping position. Double exposure of the film in such an instance will be prevented because one of the lugs 128 will be located within the channel 126 to prevent longitudinal sliding movement of the actuator 124. In order to re-synchronize the shutter-actuating mechanism with the metering mechanism, the present invention includes the provision of a synchronizing cam 202 rotatably mounted on the ceiling 204 of the housing cover section 14. The cam is spring biased to a retracted position by a torsion spring 206. The cam 202 is mounted on a stem 208 which extends through the cover section 14 and carries a knob 210 so that the cam 202 can be rotated against the bias of the spring 206. When rotated, the cam 202 passes beneath and lifts the release bar 182 (see the broken-line position of FIG. 15), thereby removing the projection 164 from the slot 158. This allows the actuator slide to be advanced by the film advance knob 74. When all slack in the film has been taken up, the film is once again advanced and the slot 158 is displaced from alignment with the projection 164.

During this re-synchronization, it may occur that the actuator 124 is advanced to its cocked position before the slot 158 returns to a position aligned with the projection 164. In such an event, further rotation of the clutch wheel 120 is prevented by engagement between the actuator 124 and a lug 128 (see the right-hand lug 128 of FIG. 9). Further advancement of the film will be afforded since the rod 87 and the sprocket wheels 98, 100 can rotate relative to the clutch wheel, the latter being spring biased into frictional driving engagement with the sprocket wheel 100 by the spring washer 122.

When the film 40 has been completely used, the magazine 30 can be removed from the compartment 22 and taken to a suitable processing facility. There is no danger to the expended film located in the pocket 34 since the magazine structure assures a light-tight seal therefor. Once at the facility, the magazine can be opened in a dark room. It can be immediately determined which spool contains the exposed film since the wind-up spool 45 is not contained within a cassette, as is the supply spool 36. There is minimal danger, then, that these spools can become inadvertently mixed in the dark room. Thus, the present film magazine provides maximum safety in an economical way by combining a film-carrying cassette and an uncased wind-up spool within a reusable magazine. Moreover, once in the darkroom, the exposed portion of the film can be cut and removed for developing. The end of the unexposed portion of the film can be reattached to the take-up spool. Subsequently the magazine can be reassembled and returned to the camera. Therefore, film waste is minimized.

Although the invention has been described in connection with a preferred embodiment thereof, it will be appreciated by those skilled in the art that additions, modifications, substitutions and deletions not specifically described may be made without departing from the spirit and scope of the invention as defined in the appended claims.

What is claimed is:

1. In a camera assembly suitable for operation by an operator having minimal photographic skills, the camera assembly including a housing to be mounted above an object to be photographed, said housing being arranged to receive a removable film magazine carrying a film supply spool and a film wind-up spool; said camera assembly comprising:

lens means mounted on said housing and being aimed downwardly therefrom;

a magazine receiving compartment having:
aperture means disposed above said lens means,
a door selectively openable to expose the interior of said compartment and permit generally horizontal insertion of said film magazine into said compartment;
said door including manually operable first drive means rotatably connectible with the wind-up spool of an installed magazine, and
spring means for retaining said magazine in proper alignment relative to said aperture means, means for selectively uncovering said lens including:
an actuator manually shiftable between a cocked position and a triggering position, and
second drive means drivingly connectible to the wind-up spool of the installed magazine for shifting said actuator to a cocked position in response to rotation of said first drive means;

metering means drivingly connected so as to be driven in response to advancement of said film;
said metering means including stop means automatically shiftable to a safety position in response to predetermined advancement of said film to prevent further film advancement; and manually operable synchronizing means for releasing said stop means from its safety position to permit further advancement of said film in the event of premature movement of said stop means to said safety position.

2. Apparatus according to claim 1 and further comprising a film magazine including flanges insertable into said compartment aperture means; and said spring means comprising a pair of spring strips fixed to a stationary wall of said compartment and arranged to bias said flanges into said aperture means.

3. Apparatus according to claim 1 wherein said first drive means comprises a film advance knob rotatably mounted on said door.

4. Apparatus according to claim 3 wherein said second drive means comprises shaft means rotatably connectible with sprocket wheel means; pawl means engageable with said sprocket wheel means to allow only one-way rotation of said sprocket wheel means, said sprocket wheel means being drivingly connected to a pair of lugs which are selectively receivable in a channel in said actuator for longitudinally shifting said actuator in response to rotation of said knob.

5. Apparatus according to claim 4 wherein said lugs are carried by a rotatable clutch wheel that is spring biased into frictional driving engagement with said sprocket wheel means.

6. Apparatus according to claim 4 wherein said metering means comprises a sprocket wheel rotatably mounted in said compartment and being receivable within drive apertures of said film; said sprocket wheel being rotatably connected to a metering wheel; a stop arm being pivotally mounted and including:

a projection arranged to enter a slot in said metering wheel when properly aligned therewith,
a foot arranged to engage said sprocket wheel means, and
spring means for biasing said stop arm such that when said film is advanced by a predetermined amount to bring said slot into engagement with said projection, said projection is biased into said slot and said foot engages said sprocket wheel means to prevent further advancement of said film.

7. Apparatus according to claim 6 wherein said stop arm includes a release bar engageable by said actuator when said actuator is in a cocked position so as to keep said projection displaced from said slot; and said synchronizing means comprises a manually rotatable cam engageable with said release bar for affording manual release of said projection from said slot to permit further film advancement.

8. A film magazine comprising:

a base element including:
a pair of spaced pockets, a first of said pockets carrying a supply of film housed in a substantially light-tight cassette, and a second of said pockets carrying a wind-up spool, said second pocket having:
pairs of spaced wall portions defining recesses at the ends of said second pocket for receiving end flanges of said wind-up spool,
spaced side wall portions defining a side recess along an outer side of said second pocket, and
a strip of resilient material disposed along an inner side of said second pocket to underlie film extending between said cassette and said wind-up spool;

an intermediate film guiding portion located between said pockets, said film guiding portion including:
a light access opening surrounded by downwardly projecting flanges, and
a secondary opening spaced from said light access opening and operable to receive a portion of a rotatable sprocket wheel of a camera;
photographic film extending between said cassette and said wind-up spool, said film including a row of spaced apertures arranged in overlying relationship to said secondary opening;

a cover element positionable atop said base element and including end sections arranged to overlie said pockets, and an intermediate section arranged to overlie the film guiding portion of said base element;

the end section of said cover element which overlies said second pocket including a lip extending across an outer side of such end section and being received in said side recess of said second pocket;

said intermediate section of said cover element including a series of ribs extending downwardly to press against said film, and a transverse wall disposed above said strip of said resilient material to press the film thereagainst;

connecting means for releasably attaching said cover element to said base element; and means defining handles for manipulating the magazine into and from a camera.

* * * * *